(12) United States Patent
Matsuda et al.

(10) Patent No.: US 10,164,397 B2
(45) Date of Patent: Dec. 25, 2018

(54) LASER OSCILLATION DEVICE

(71) Applicant: MITSUBISHI HEAVY INDUSTRIES, LTD., Tokyo (JP)

(72) Inventors: Ryuichi Matsuda, Tokyo (JP); Shingo Nishikata, Tokyo (JP); Koichi Hamamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/558,356

(22) PCT Filed: Sep. 17, 2015

(86) PCT No.: PCT/JP2015/076464
§ 371 (c)(1),
(2) Date: Sep. 14, 2017

(87) PCT Pub. No.: WO2016/151892
PCT Pub. Date: Sep. 29, 2016

(65) Prior Publication Data
US 2018/0083408 A1    Mar. 22, 2018

(30) Foreign Application Priority Data
Mar. 26, 2015 (JP) .................. 2015-064178

(51) Int. Cl.
*H01S 3/042* (2006.01)
*H01S 3/10* (2006.01)
(Continued)

(52) U.S. Cl.
CPC .............. *H01S 3/042* (2013.01); *H01S 3/027* (2013.01); *H01S 3/0407* (2013.01);
(Continued)

(58) Field of Classification Search
CPC .... H01S 3/042; H01S 3/027; H01S 3/094049; H01S 3/0615; H01S 3/0606; H01S 3/1618; H01S 3/1643; H01S 3/0407
See application file for complete search history.

(56) References Cited

U.S. PATENT DOCUMENTS 4,495,782 A * 1/1985 Salour .................. F17C 3/085
250/352
7,039,080 B1 * 5/2006 Talmadge ............ H01S 3/1301
372/29.02
(Continued)

FOREIGN PATENT DOCUMENTS

JP    2001-24255      1/2001
JP    2001-217487     8/2001
(Continued)

OTHER PUBLICATIONS

Furuse, Hiroaki et al., "Total-reflection active-mirror cryogenically cooled Yb:YAG laser—towards the development of an ideal light source", Laser Cross, May 2009, No. 254, pp. 1-2.
(Continued)

*Primary Examiner* — Xinning (Tom) Niu
(74) *Attorney, Agent, or Firm* — Wenderoth, Lind & Ponack, L.L.P.

(57) ABSTRACT

A laser oscillation device includes: a refrigerant container; at least one cartridge which is attached to the refrigerant container and which includes a laser gain medium and an incidence path section for guiding laser seed light to the laser gain medium; at least one nozzle for spraying a refrigerant to the laser gain medium, the at least one nozzle being disposed inside the refrigerant container, and a vacuum heat insulating container housing the refrigerant container inside and forming a vacuum insulation layer on an outer peripheral side of the refrigerant container. The cartridge is dis-
(Continued)

posed so as to be insertable and removable with respect to the refrigerant container along a longitudinal direction of the laser gain medium.

18 Claims, 19 Drawing Sheets

(51) Int. Cl.
*H01S 3/02* (2006.01)
*H01S 3/04* (2006.01)
*H01S 3/06* (2006.01)
*H01S 3/094* (2006.01)
*H01S 3/16* (2006.01)

(52) U.S. Cl.
CPC .......... *H01S 3/0606* (2013.01); *H01S 3/0615* (2013.01); *H01S 3/094049* (2013.01); *H01S 3/10* (2013.01); *H01S 3/1618* (2013.01); *H01S 3/1643* (2013.01)

(56) References Cited

U.S. PATENT DOCUMENTS

| | | |
|---|---|---|
| 2002/0110162 A1 | 8/2002 | Ludewigt |
| 2005/0111496 A1* | 5/2005 | Reeder .................. H01S 3/0606 372/9 |
| 2008/0151946 A1 | 6/2008 | Zafrani et al. |
| 2010/0111121 A1* | 5/2010 | Takeshita .............. H01S 3/0604 372/29.01 |
| 2011/0176574 A1 | 7/2011 | Ikegawa et al. |
| 2014/0169393 A1* | 6/2014 | Thyzel .................. H01S 3/0407 372/35 |

FOREIGN PATENT DOCUMENTS

| | | |
|---|---|---|
| JP | 2003-507899 | 2/2003 |
| JP | 3500122 | 2/2004 |
| JP | 2010-34413 | 2/2010 |
| JP | 2010-114162 | 5/2010 |
| JP | 2011-54675 | 3/2011 |

OTHER PUBLICATIONS

International Search Report dated Dec. 8, 2015 in International (PCT) Application No. PCT/JP2015/076464, with English translation.
International Preliminary Report on Patentability dated Oct. 5, 2017 in International (PCT) Application No. PCT/JP2015/076464, with English translation.
Japanese Office Action dated Oct. 18, 2017 in corresponding Japanese Application No. 2015-064178, with English translation.

\* cited by examiner

LASER OSCILLATION DEVICE

TECHNICAL FIELD

The present disclosure relates to a laser oscillation device.

BACKGROUND ART

A solid laser oscillation device, typically a YAG laser using yttrium (Y) aluminum (Al) garnet (G) crystals as a laser gain medium, is required to cool the laser gain medium to keep the lower energy level less populated, in order to improve the efficiency of laser oscillation.

For instance, a YAG laser doped with ytterbium (Yb) is required to cool the laser gain medium to a temperature not more than 120K, or more preferably, not more than 100K.

Patent Document 1 discloses a laser oscillator. The laser oscillator includes an optical medium, a plurality of first-surface side gain media, at least one second-surface side gain medium, and a cooling unit. The optical medium is transparent to laser light, and includes an incidence medium surface, the first surface, and the second surface facing the first surface. The plurality of first-surface side gain media are excited by excitation light, and amplify laser light while totally reflecting the laser light. The first-surface side media are joined to the optical medium on the first surface of the optical medium. The at least one second-surface side gain medium is, similarly to the first-surface side gain media, excited by excitation light, and amplify laser light while totally reflecting the laser light. The second-surface side medium is joined to the optical medium on the second surface of the optical medium. The cooling unit cools the back surface side of each of the plurality of first-surface side gain media and the at least one second-surface side gain medium, and is disposed so as to cool a plurality of first reflection surfaces and at least one second reflection surface of the gain media.

CITATION LIST

Patent Literature

Patent Document 1: JP2010-114162A

SUMMARY

Problems to be Solved

Meanwhile, although laser gain media are expendables because of their fragility against thermal stress and the like, the laser gain media are surrounded by mirrors and the like that cannot be easily adjusted, which makes it difficult to replace the laser gain media.

In view of the above, an object of at least one embodiment of the present invention is to provide a laser oscillation device equipped with an easily replaceable laser gain medium.

Solution to the Problems (1) A laser oscillation device according to at least one embodiment of the present invention comprises: a refrigerant container; at least one cartridge which is attached to the refrigerant container and which includes a laser gain medium and an incidence path section for guiding laser seed light to the laser gain medium; at least one nozzle for spraying a refrigerant to the laser gain medium, the at least one nozzle being disposed inside the refrigerant container; and a vacuum heat insulating container housing the refrigerant container inside and forming a vacuum insulation layer on an outer peripheral side of the refrigerant container. The cartridge is disposed so as to be insertable and removable with respect to the refrigerant container along a longitudinal direction of the laser gain medium.

With the above configuration (1), the at least one cartridge is disposed so as to be insertable and removable with respect to the refrigerant container along the longitudinal direction of the laser gain medium, and thereby it is possible to replace the laser gain medium in the cartridge easily with respect to the refrigerant container.

(2) In some embodiments, in the above configuration (1), the vacuum heat insulating container includes an incidence window for introducing the laser seed light traveling toward the incidence path section into the vacuum heat insulating container.

With the above configuration (2), the vacuum heat insulating container includes the incidence window for taking the laser seed light traveling toward the incidence path section into the vacuum heat insulating container, and thereby it is possible to take the laser seed light traveling toward the incidence path section into the vacuum heat insulating container through the incidence window.

(3) In some embodiments, in the above configuration (1) or (2), the incidence path section is configured to guide the laser seed light to the laser gain medium along the longitudinal direction of the laser gain medium.

With the above configuration (3), the incidence path section is configured to guide the laser seed light to the laser gain medium along the longitudinal direction of the laser gain medium, and thereby it is possible to reduce a cross section of the incidence path section that is orthogonal to the longitudinal direction of the laser gain medium. Accordingly, it is possible to reduce the size of the cartridge.

(4) In some embodiments, in the above configuration (1) or (2), the incidence path section is configured to guide the laser seed light to the laser gain medium so that the laser seed light enters in a direction perpendicular to an incidence medium surface of the laser gain medium.

With the above configuration (4), the incidence path section is configured to guide the laser seed light to the laser gain medium so that the laser seed light enters in a direction perpendicular to the incidence medium surface of the laser gain medium, and thereby it is possible to suppress reflection when the laser seed light enters the laser gain medium.

(5) In some embodiments, in any one of the above configurations (1) to (4), the laser gain medium has a corner cube including at least two faces forming a right angle at an end portion opposite to the incidence path section. The incidence path section is configured to guide laser light reflected by the corner cube and outputted from the laser gain medium outside the vacuum heat insulating container.

With the above configuration (5), the incidence path section is configured to guide the laser light reflected by the corner cube and emitted from the laser gain medium outside the vacuum heat insulating container, and thereby it is possible to guide the laser light reflected by the corner cube and emitted from the laser gain medium outside the vacuum heat insulating container.

(6) In some embodiments, in any one of the above configurations (1) to (4), the cartridge further includes an output path section for guiding laser light outputted from the laser gain medium, the output path section being disposed on an opposite side of the laser gain medium from the incidence path section.

With the above configuration (6), the cartridge further includes the output path section for guiding the laser light outputted from the laser gain medium, and thereby it is possible to guide the laser light outputted from the laser gain medium through the output path section.

(7) In some embodiments, in any one of the above configurations (1) to (6), the cartridge has an opening in a region facing the nozzle so that a jet flow of the refrigerant from the nozzle collides with the laser gain medium.

With the above configuration (7), the cartridge has the opening in a region facing the nozzle, so that a jet flow of the refrigerant from the nozzle hits the laser gain medium, and thereby a jet flow of the refrigerant from the nozzle passes through the openings in a region facing the nozzle and hits the laser gain medium.

(8) In some embodiments, in any one of the above configurations (1) to (7), the cartridge has a flange on a first end side in the longitudinal direction, the flange forming the incidence path section. The refrigerant container has a container opening which is smaller than a contour of the flange and through which a second end side of the cartridge is passable. The flange of the cartridge is fixed to a wall member of the refrigerant container around the container opening.

With the above configuration (8), the second end side of the cartridge is inserted into the container opening of the refrigerant container, and the flange of the cartridge is fixed to a wall member around the container opening. Thus, it is possible to replace the laser gain medium in the cartridge easily with respect to the refrigerant container.

(9) In some embodiments, in the above configuration (8), a second end portion of the cartridge is in contact with an inner wall surface of the refrigerant container in a region of the refrigerant container intersecting with a virtual line extended in the longitudinal direction from the container opening.

With the above configuration (9), the second end portion of the cartridge is in contact with the inner wall surface of the refrigerant container in a region of the refrigerant container that intersects with a virtual line extended from the container opening in the longitudinal direction, and thereby the second end portion of the cartridge is also supported on the inner wall surface of the refrigerant container.

(10) In some embodiments, in any one of the above configurations (1) to (9), the cartridge includes: the laser gain medium; and a holder portion for holding the laser gain medium, the holder portion forming the incidence path section. The laser gain medium is disposed so as to be insertable and removable with respect to the holder portion along a direction orthogonal to the longitudinal direction.

With the above configuration (10), the laser gain medium is disposed so as to be insertable and removable with respect to the holder portion along a direction orthogonal to the longitudinal direction, and thereby it is possible to replace the laser gain medium easily with respect to the holder portion.

(11) In some embodiments, in the above configuration (10), the holder portion includes: a holder body having a holder opening through which the laser gain medium is passable in a direction orthogonal to the longitudinal direction; and a lid member configured to fix the laser gain medium having passed through the holder opening along with the holder body.

With the above configuration (11), the holder portion includes a holder body having a holder opening through which the laser gain medium can pass through in a direction orthogonal to the longitudinal direction, and a lid member configured to fix the laser gain medium having passed through the holder opening with the holder portion, and thereby the lid member can fix the laser gain medium having passed through the holder opening of the holder body along with the holder body.

(12) in some embodiments, in any one of the above configurations (1) to (11), the refrigerant comprises liquid nitrogen.

With the above configuration (12), the refrigerant is liquid nitrogen, and thus the laser gain medium sprayed with the refrigerant can be cooled to a temperature not more than 100K.

(13) In some embodiments, in any one of the above configurations (1) to (12), the laser gain medium includes: an optical medium which is transparent to the laser seed light and which has a first surface and a second surface facing the first surface; and a gain medium sheet for amplifying the laser seed light, the gain medium sheet being attached to each of the first surface and the second surface of the optical medium. The nozzle is configured to spray the refrigerant onto the gain medium sheet.

With the above configuration (13), the refrigerant is sprayed to the gain medium sheet to cool the gain medium sheet, and thereby it is possible to cool the laser gain medium efficiently.

(14) In some embodiments, in any one of the above configurations (1) to (13), the cartridge comprises a plurality of cartridges including a first cartridge and a second cartridge which are insertable and removable with respect to the refrigerant container along the longitudinal direction.

With the above configuration (14), the plurality of cartridges including the first cartridge and the second cartridge are disposed so as to be insertable and removable in the longitudinal direction with respect to the refrigerant container, and thereby it is possible to replace the plurality of cartridges including the first cartridge and the second cartridge easily with respect to the refrigerant container.

(15) In some embodiments, in the above configuration (14), the laser oscillation device is configured such that the laser seed light passes through the laser gain medium of the first cartridge to be amplified and then passes through the laser gain medium of the second cartridge to be further amplified.

With the above configuration (15), the laser oscillation device is configured such that the laser seed light passes through the laser gain medium of the first cartridge to be amplified, and then passes through the laser gain medium of the second cartridge to be further amplified. Thus, the laser seed light passes through the laser gain medium of the first cartridge to be amplified, and then passes through the laser gain medium of the second cartridge to be further amplified.

Advantageous Effects

According to at least one embodiment of the present invention, it is possible to replace the laser gain medium in the cartridge easily with respect to the refrigerant container.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
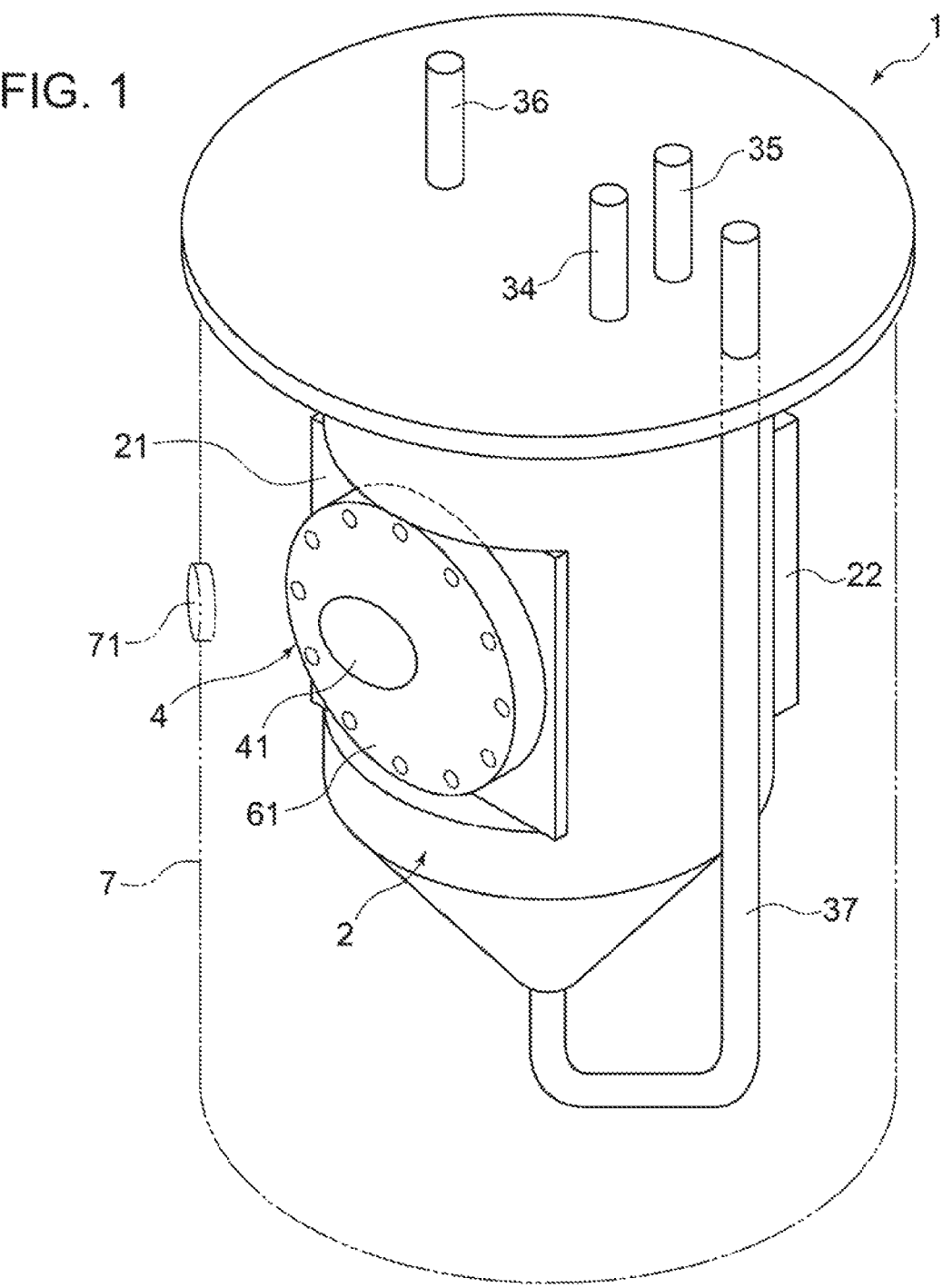
FIG. 1 is a schematic perspective diagram of an external view of a main part of a laser oscillation device according to an embodiment of the present invention.
Figure 2:
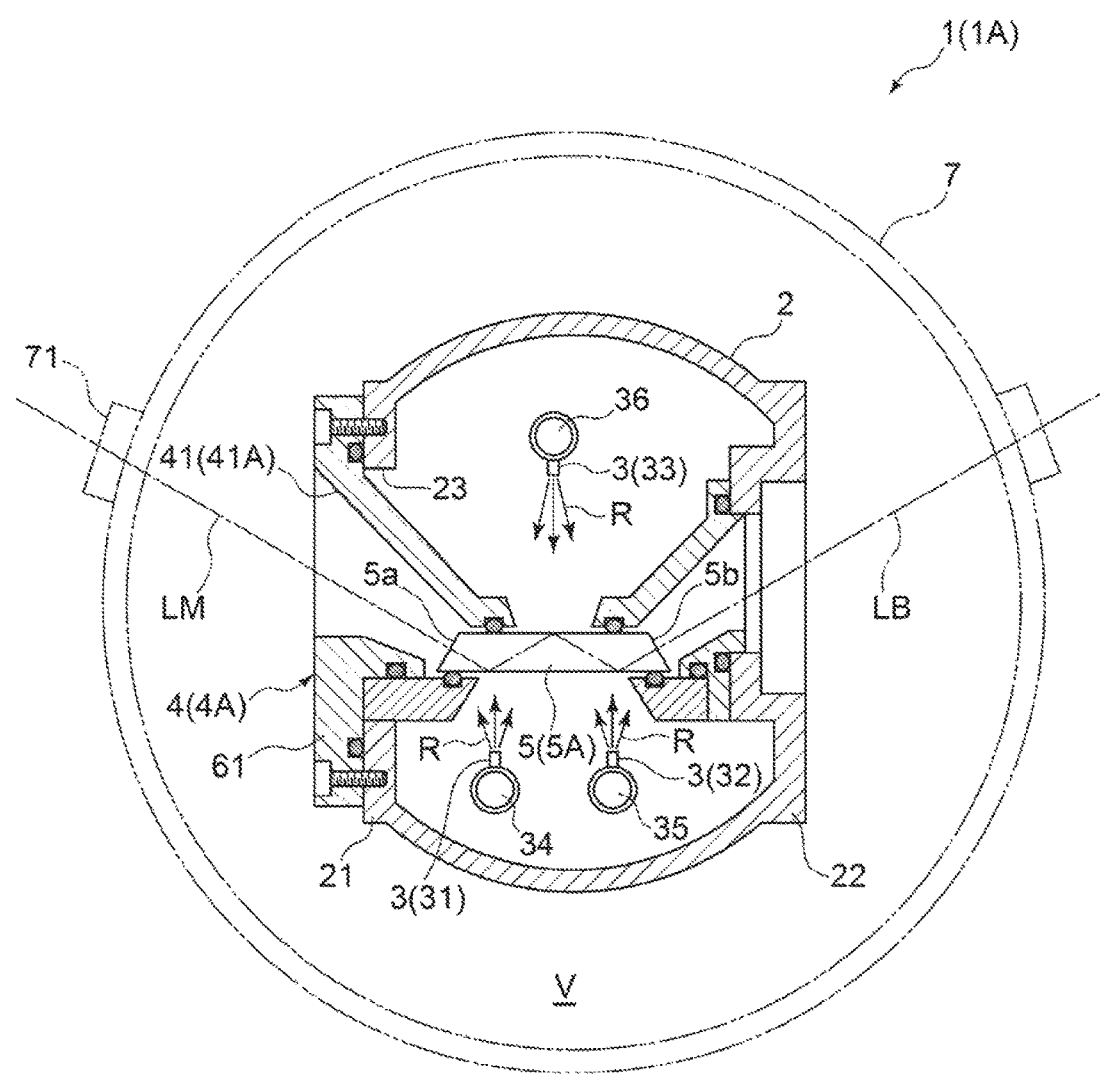
FIG. 2 is a lateral cross-sectional view of a main configuration of a laser oscillation device according to an embodiment of the present invention.
Figure 3:
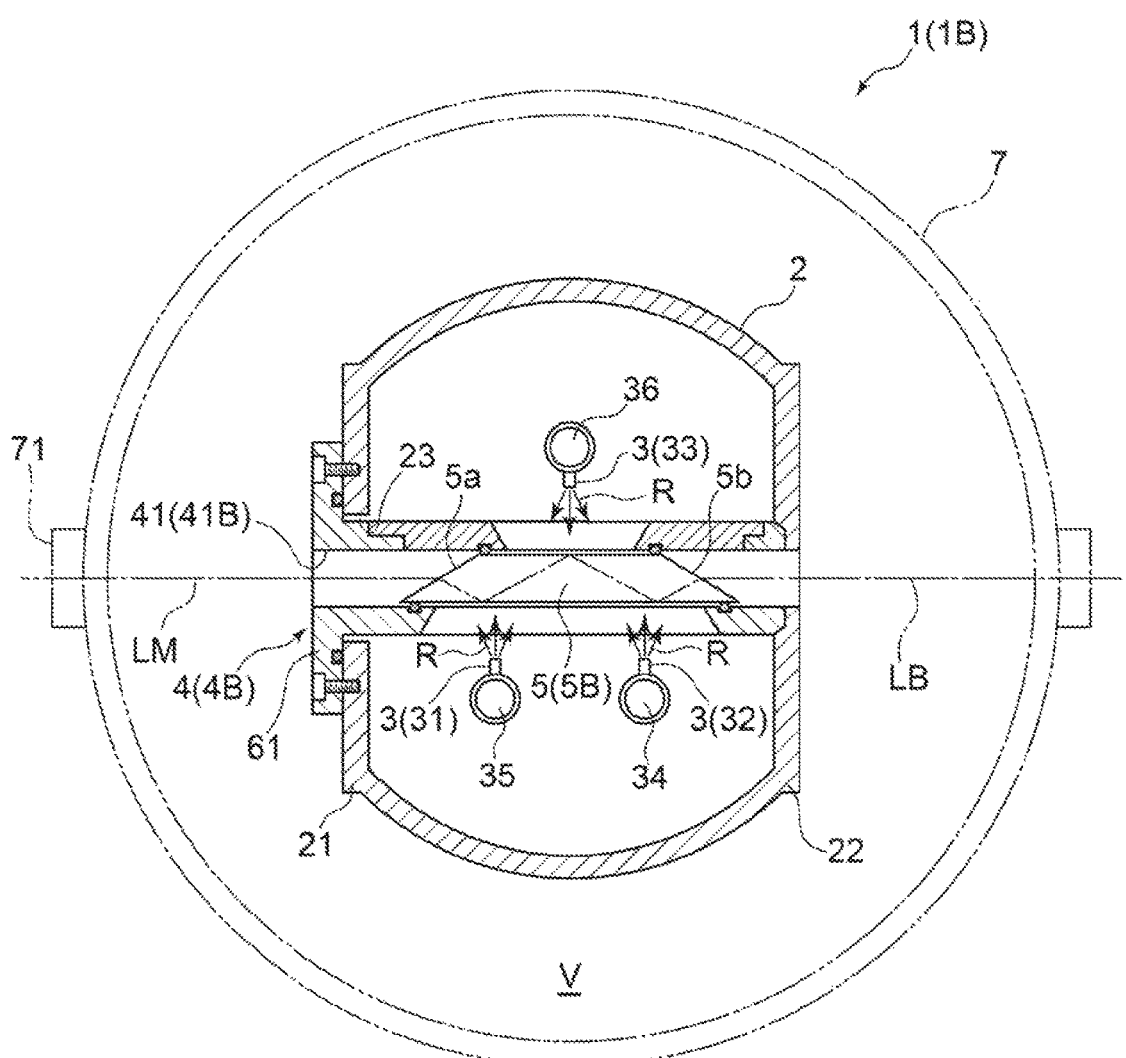
FIG. 3 is a lateral cross-sectional view of a main configuration of a laser oscillation device according to an embodiment of the present invention.
Figure 4:
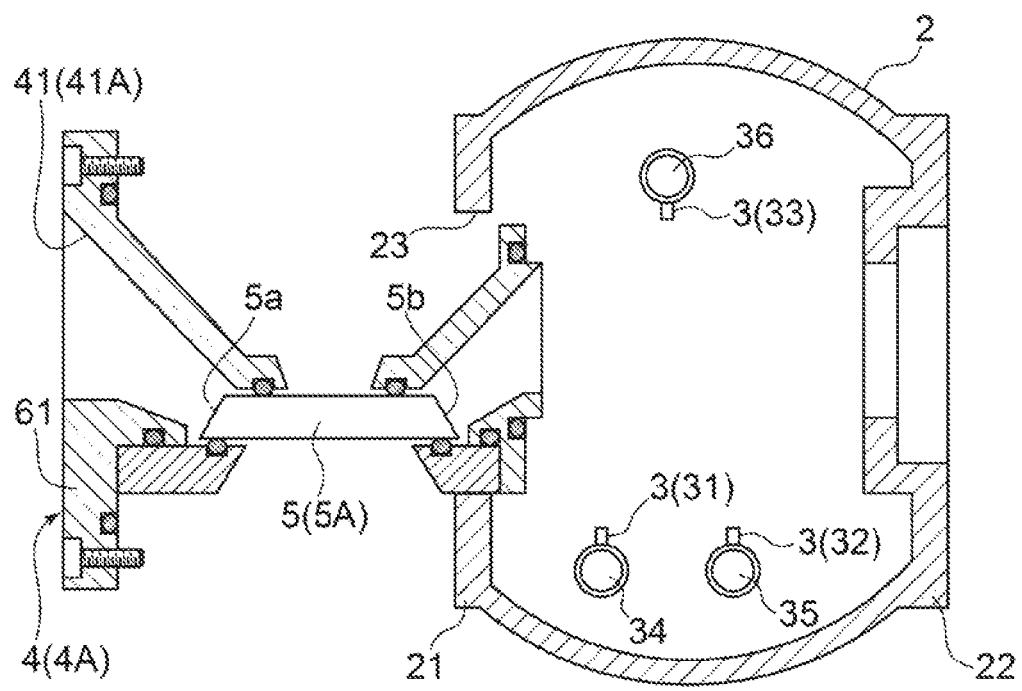
FIG. 4 is a view of the laser oscillation device shown in FIG. 2, where a cartridge is removed from a refrigerant container.

FIG. 1 is a schematic perspective diagram of an external view of a main part of a laser oscillation device 1 according to an embodiment of the present invention. FIGS. 2 and 3 are each a lateral cross-sectional view of a main configuration of the laser oscillation device 1. FIG. 4 is a view of the laser oscillation device 1 shown in FIG. 2, where a cartridge 4 is removed from a refrigerant container 2.

Figure 5:
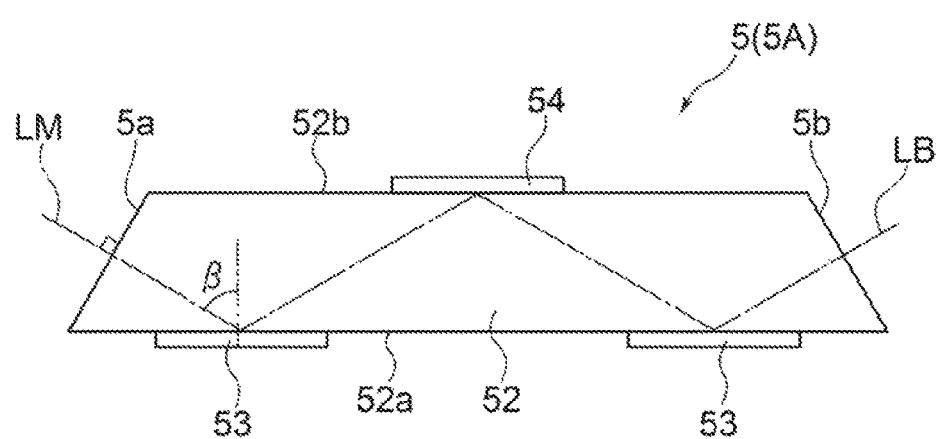
FIG. 5 is a detailed view of a laser gain medium according to an embodiment.
Figure 6:
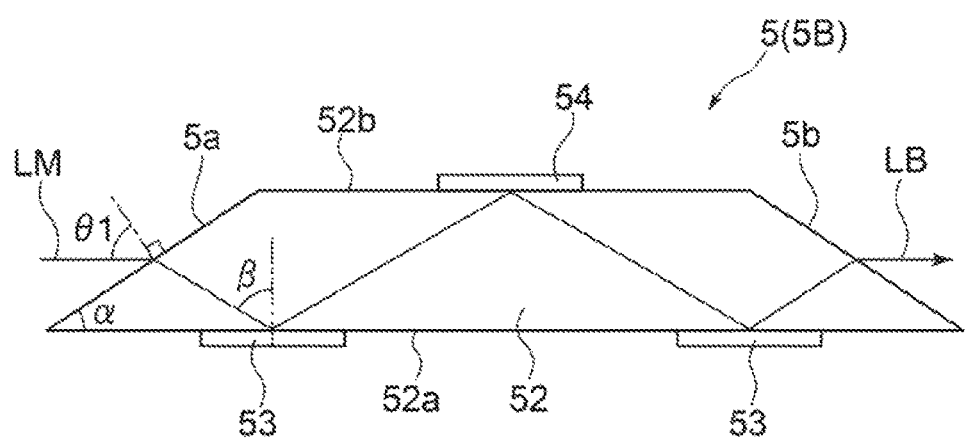
FIG. 6 is a detailed view of a laser gain medium according to an embodiment.

Further, FIGS. 5 and 6 are diagrams showing a laser gain medium 5 according to an embodiment in detail. FIG. 5 is a diagram of a laser gain medium 5A into which laser seed light LM enters in a direction perpendicular to the incidence medium surface. FIG. 6 is a diagram of a laser gain medium 5B into which the laser seed light LM enters along a longitudinal direction.

As shown in FIG. 1, the laser oscillation device 1 according to at least one embodiment of the present invention includes a refrigerant container 2, at least one cartridge 4, at least one nozzle 3 (see FIG. 2), and a vacuum heat insulating container 7.

The refrigerant container 2 is an airtight container that seals the inside from the outside.

In an embodiment shown in FIGS. 1 to 3, the refrigerant container 2 is a cylindrical container having an annular lateral cross section, including a front plate portion 21 and a rear plate portion 22 disposed on the side surface of the refrigerant container 2.

As shown in FIGS. 2 and 3, the at least one cartridge 4 is attached to the refrigerant container 2. The cartridge 4 includes the laser gain medium 5 and an incidence path section 41.

In an embodiment shown in FIGS. 2 and 3, the cartridge 4 has a cuboid shape, and the incidence path section 41 is disposed on an end of the cartridge 4. Accordingly, an incidence medium surface 5a of the laser gain medium 5 is visible via the incidence path section 41. Further, although not shown, an optical fiber for measuring the temperature of the laser gain medium 5 is attached. The optical fiber is removed out of the refrigerant container 2 via a feedthrough (not shown) disposed on a flange 61 described below.

The laser gain medium 5 is for amplifying laser seed light. A state of population inversion in which stimulated emission dominates absorption is achieved through pumping, and laser seed light is amplified by stimulated emission.

In the embodiment shown in FIGS. 2 and 3, the laser gain medium 5 is a YAG laser using yttrium (Y) aluminum (Al) garnet (G) crystals, doped with ytterbium (Yb). Accordingly, the laser gain medium 5 is required to be cooled to a temperature not more than 120K, or more preferably, not more than 100K.

Furthermore, while the laser gain medium 5 has a trapezoid shape in which the laser seed light LM is reflected for an odd number of times in the embodiment shown in FIGS. 2 and 3, the shape is not limited to this, and may be a parallelogram in which the laser seed light LM is reflected for an even number of times. The number of reflection is determined in a range in which excitation light LE reaches without attenuating inside the medium, which is normally about three times.

The incidence path section 41 is for guiding the laser seed light LM to the laser gain medium 5.

In the embodiment shown in FIGS. 2 and 3, the incidence path section 41 is disposed in a front region of the incidence medium surface 5a of the laser gain medium 5.

As shown in FIGS. 2 and 4, the cartridge 4 is disposed so as to be insertable and removable with respect to the refrigerant container 2 along the longitudinal direction of the laser gain medium 5.

As shown in FIGS. 2 and 3, the at least one nozzle 3 is for spraying a refrigerant R to the laser gain medium 5, and is disposed inside the refrigerant container 2.

In the embodiment shown in FIGS. 2 and 3, two nozzles 31, 32 are disposed in a region facing the first surface of the laser gain medium 5, and one nozzle 33 is disposed in a region facing the second surface of the laser gain medium 5. Refrigerant pipes 34, 35, 36 for supplying the refrigerant R are connected respectively to the nozzles 31, 32, 33. The refrigerant R is supplied to the respective nozzles 31, 32, 33 from a refrigerant supply source (not shown), and is sprayed to the laser gain medium 5 through the nozzles 31, 32, 33. As shown in FIG. 1, the sprayed refrigerant R is recovered through a recovery pipe 37 connected to a bottom section of the refrigerant container 2.

As shown in FIGS. 2 and 3, the vacuum heat insulating container 7 forms a vacuum heat insulating layer V on the outer peripheral side of the refrigerant container 2, and houses the refrigerant container 2 inside.

In the embodiment shown in FIGS. 2 and 3, the vacuum heat insulating container 7 is a cylindrical airtight container having an annular lateral cross section, similarly to the refrigerant container 2. Further, as described above, since the vacuum heat insulating layer V is formed in the vacuum heat insulating container 7, the refrigerant container 2 and the cartridge 4 housed in the vacuum heat insulating container 7 are sealed by seal members such as an O-ring and an indium seal. Further, although not shown, the vacuum heat insulating container 7 is equipped with an outlet, a valve, a vacuum gauge, legs, etc.

With the above configuration, the at least one cartridge 4 is disposed so as to be insertable and removable with respect to the refrigerant container 2 along the longitudinal direction of the laser gain medium 5, and thereby it is possible to replace the laser gain medium 5 in the cartridge 4 easily with respect to the refrigerant container 2.

As shown in FIGS. 1 to 3, in some embodiments, the vacuum heat insulating container 7 includes an incidence window 71. The incidence window 71 for taking the laser seed light LM traveling toward the incidence path section 41 into the vacuum heat insulating container.

In the embodiment shown in FIGS. 1 and 3, the incidence window 71 is disposed at the same height-directional position as the height-directional position of the laser gain medium 5.

With the above configuration, the vacuum heat insulating container 7 includes the incidence window 71 for taking the laser seed light LM traveling toward the incidence path section 41 into the vacuum heat insulating container, and thereby it is possible to take the laser seed light LM traveling toward the incidence path section 41 into the vacuum heat insulating container 7 through the incidence window 71. The incidence window 71 is coated with an anti-reflection layer (not shown), and reflection of the laser seed light LM is suppressed.

As shown in FIG. 3, in some embodiments, the incidence path section 41B is configured to guide the laser seed light LM to the laser gain medium 5B along the longitudinal direction of the laser gain medium 51.

As shown in FIG. 6, the laser gain medium 5B according to some embodiments is formed so that the laser seed light LM entering along the longitudinal direction is totally reflected. That is, the laser gain medium 5B is formed so that the angle β is greater than the critical angle (β>critical angle).

In the embodiment shown in FIG. 6, the angle α of the incidence medium surface 5a is 32.34 degrees, provided that the refractive index n1 of air is 1.00, the refractive index n2 of the laser gain medium 5B is 1.82, the refractive index n3 of the refrigerant is 1.20, and the angle β is 60 degrees.

Furthermore, the incidence medium surface 5a of the laser gain medium 5B is coated with an anti-reflection layer (not shown), and reflection of the laser seed light LM is suppressed.

With the above configuration, the incidence path section 41B is configured to guide the laser seed light LM to the laser gain medium 5 along the longitudinal direction of the laser gain medium 5B, and thereby it is possible to reduce a cross section of the incidence path section 41 that is orthogonal to the longitudinal direction of the laser gain medium 5B. Accordingly, it is possible to reduce the size of the cartridge 4. Furthermore, the axis of light is straight in front and rear of the laser gain medium 5B, and thus mirrors or the like can be disposed in a straight line.

As shown in FIG. 2, in some embodiments, the incidence path section 41A is configured to guide the laser seed light LM to the laser gain medium 5A so that the laser seed light LM enters in a direction perpendicular to the incidence medium surface 5a of the laser gain medium 5.

As shown in FIG. 5, the laser gain medium 5A according to some embodiments is formed so that the laser seed light LM entering in a direction perpendicular to the incidence medium surface 5a is totally reflected. That is, the laser gain medium 5A is formed so that the angle β is greater than the critical angle (β>critical angle).

With the above configuration, the incidence path section 41 is configured to guide the laser seed light LM to the laser gain medium 5 so that the laser seed light LM enters in a direction perpendicular to the incidence medium surface 5a of the laser gain medium 5A, and thereby it is possible to suppress reflection when the laser seed light LM enters the laser gain medium 5A.

Figure 7:
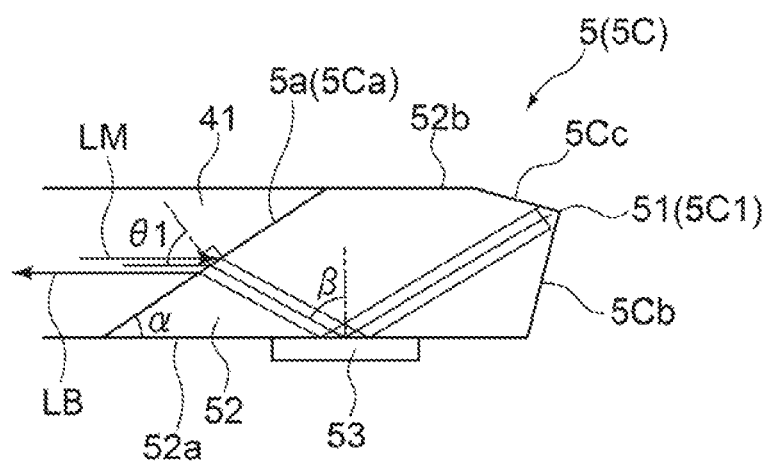
FIG. 7 is a detailed view of a laser gain medium according to an embodiment.
Figure 8:
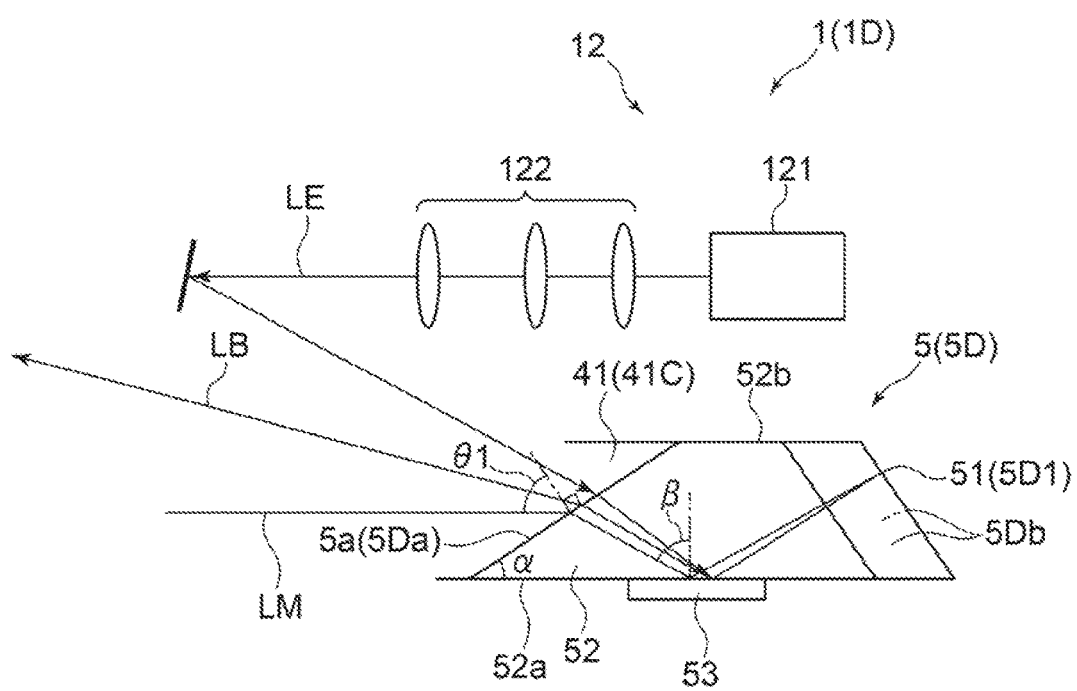
FIG. 8 is a detailed view of a laser gain medium according to an embodiment.
Figure 9:
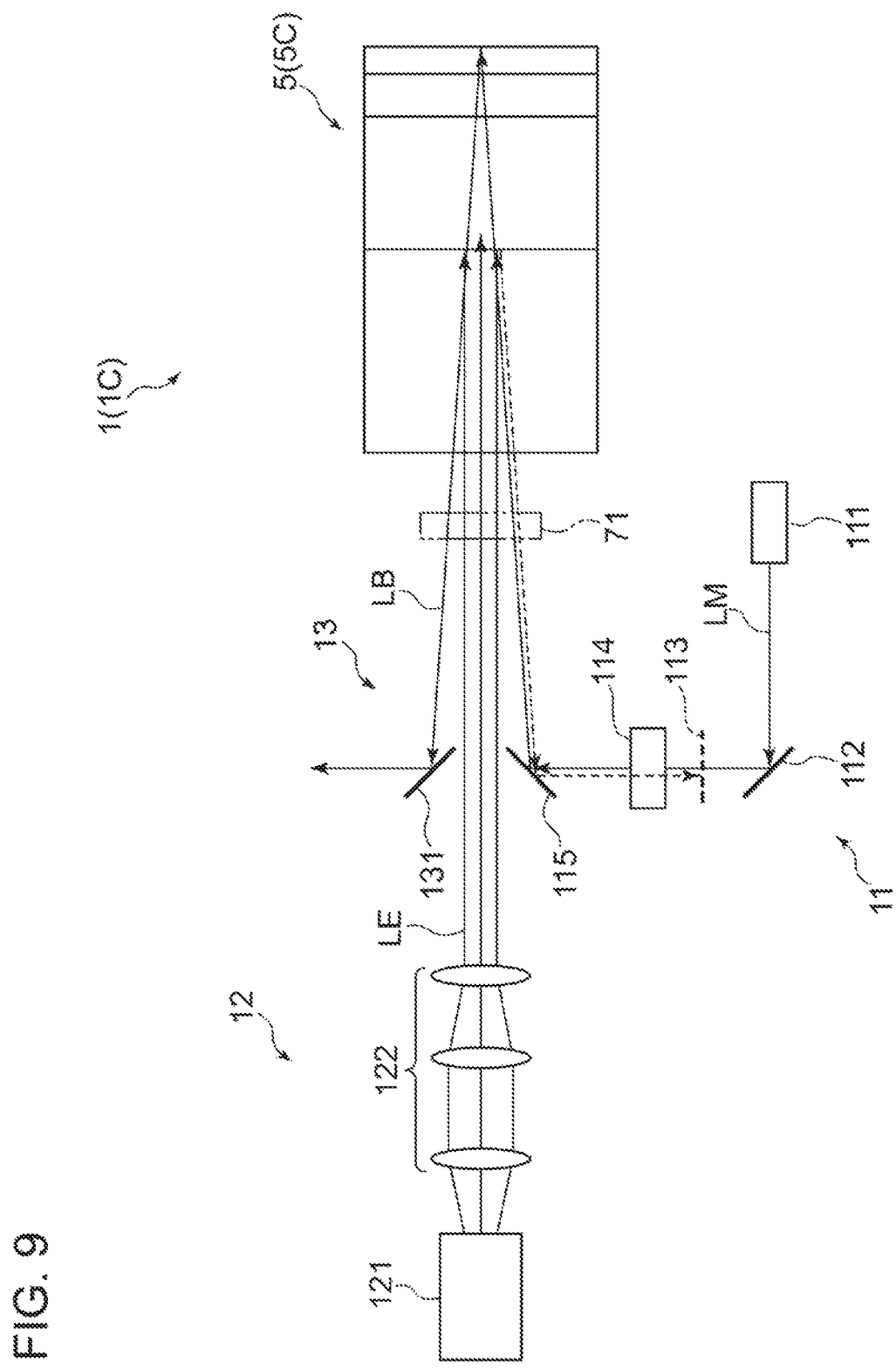
FIG. 9 is a conceptual configuration diagram of a laser oscillation device provided with the laser gain medium shown in FIG. 7.
Figure 10:
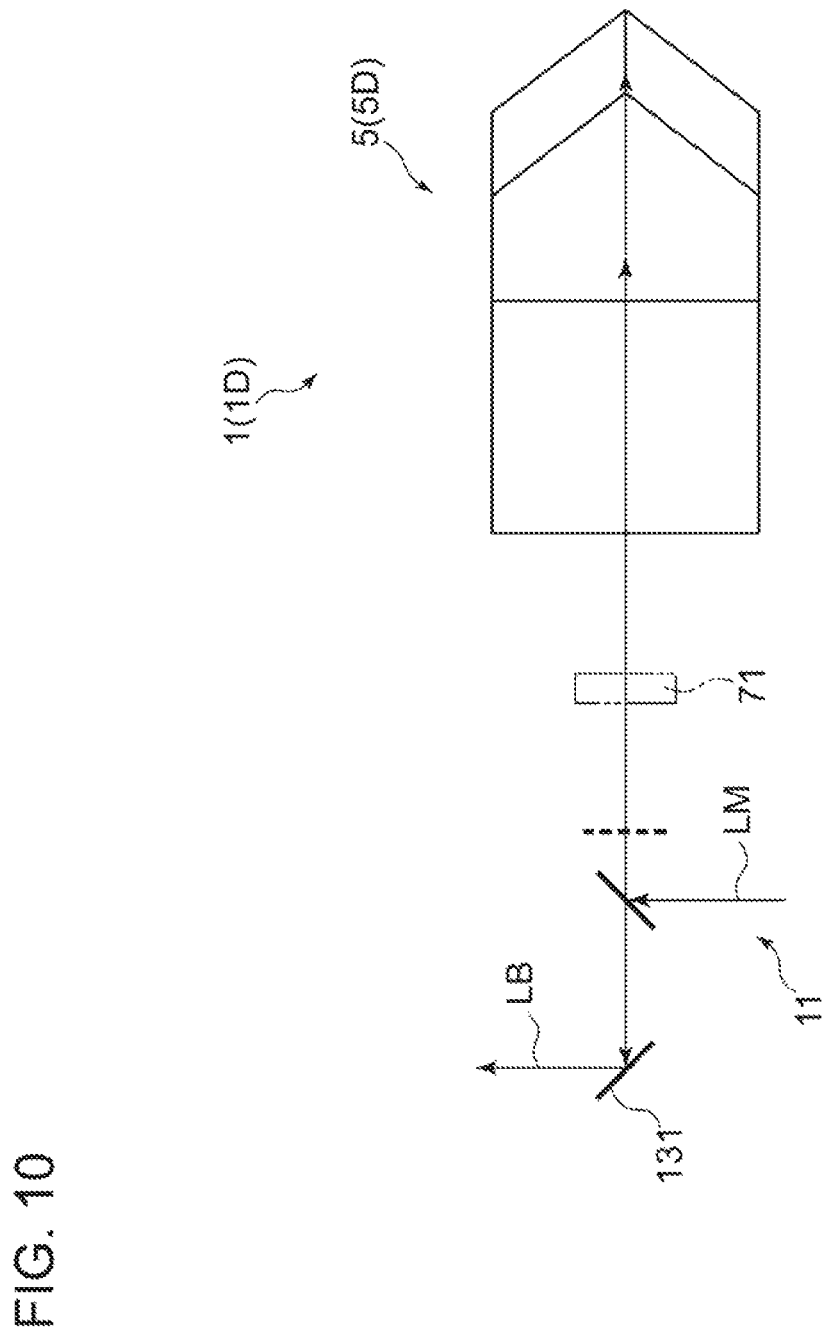
FIG. 10 is a conceptual configuration diagram of a laser oscillation device provided with the laser gain medium shown in FIG. 8.

FIGS. 7 and 8 are each a detailed view of the laser gain medium 5 according to an embodiment. Furthermore, FIG. 9 is a conceptual configuration diagram of the laser oscillation device 1 (1C) provided with the laser gain medium 5C shown in FIG. 7, and FIG. 10 is a conceptual configuration diagram of the laser oscillation device 1 (1D) provided with the laser gain medium 5D shown in FIG. 8.

As shown in FIGS. 7 and 8, in some embodiments, the laser gain medium 5 has a corner cube 5 having at least two faces that form a right angle, at an end portion opposite to the incidence path section 41. Furthermore, the incidence path section 41 is configured to guide laser light LB reflected by the corner cube 51 and emitted from the laser gain medium 5 outside the vacuum heat insulating container.

In the embodiment shown in FIGS. 7 and 8, the incidence medium surface 5a of the laser gain medium 5 is coated with an anti-reflection layer, and reflection of the laser seed light LM is suppressed. Furthermore, the two faces forming the corner cube 51 of the laser gain medium 5 are coated with total reflection mirrors, and reflection of the laser seed light LM is promoted.

In the embodiment shown in FIG. 7, the laser gain medium 5C includes a corner cube 5C1 formed by two faces that form a right angle at an end portion opposite to the incidence medium surface 5Ca. The corner cube 5C1 is for retro-reflecting incident light. In the embodiment shown in FIG. 7, a rear end surface 5Cb and a side surface 5Cc adjacent to the rear end surface 5Cb form a right angle.

In the embodiment shown in FIG. 8, the laser gain medium 5D includes a corner cube 5D1 formed by two faces that form a right angle at an end portion opposite to the incidence medium surface 5Da. The corner cube 5D1 is for retro-reflecting incident light. In the embodiment shown in FIG. 8, two rear end surfaces 5Db that are adjacent to each other form a right angle.

With the above configuration, the incidence path section 41 is configured to guide the laser light LB reflected by the corner cube 51 and emitted from the laser gain medium 5 outside the vacuum heat insulating container 7, and thereby it is possible to guide the laser light LB reflected by the corner cube 51 and emitted from the laser gain medium 5 outside the vacuum heat insulating container 7.

As shown in FIGS. 9 and 10, the laser oscillation device 1 according to some embodiments is configured to guide the laser light LB reflected by the corner cube 51 opposite to the incidence medium surface 5a and emitted from the laser gain medium 5 outside the vacuum heat insulating container.

The laser oscillation device 1 according to the embodiment shown in FIG. 9 and includes a seed-light incidence system 11, an excitation-light incidence system 12, and a laser-light emission system 13.

The seed-light incidence system 11 is for incidence (supply) of the laser seed light to the laser gain medium 5.

In the embodiment shown in FIG. 9, the seed-light incidence system 11 includes a seed light source 111, a mirror 112, a light polarizer 113, a quarter waveplate 114, and a mirror 115. The seed light source 111 comprises a solid laser or a fiber laser, for instance. The quarter waveplate 114 is for preventing laser light (amplified light) from returning to the seed light source from the laser gain medium 5. The quarter waveplate 115 turns the outgoing polarization direction, so that the inverse light does not pass through the light polarizer 113.

The excitation-light incidence system 12 is for incidence (supply) of the excitation light LE to the laser gain medium 5.

In the embodiment shown in FIGS. 9 and 10, the excitation-light incidence system 12 includes an excitation light source 121 and a focusing lens group 122. The excitation light source 121 comprises an excitation laser, for instance, a semiconductor laser. The focusing lens group 122 is for focusing excitation light LE toward a region of reflection of the laser seed light LM. The focusing lens group 122 is not limited to lens and may comprise mirrors.

The laser-light emission system 13 is for emission (output) of the amplified laser light LB.

In the embodiment shown in FIGS. 9 and 10, the laser-light emission system 13 is configured to pass through a different path from the laser seed light LM and the excitation light LE, and comprises a mirror 131, for instance.

With the above configuration, since the range in which the excitation light LE reaches without attenuating inside the laser gain medium 5 is the same as the laser oscillation device 1 that outputs from an output surface opposite to the incidence medium surface 5a, the reflection number is doubled in a laser oscillation device provided with the laser gain medium of the same size, which improves the efficiency.

Figure 11:
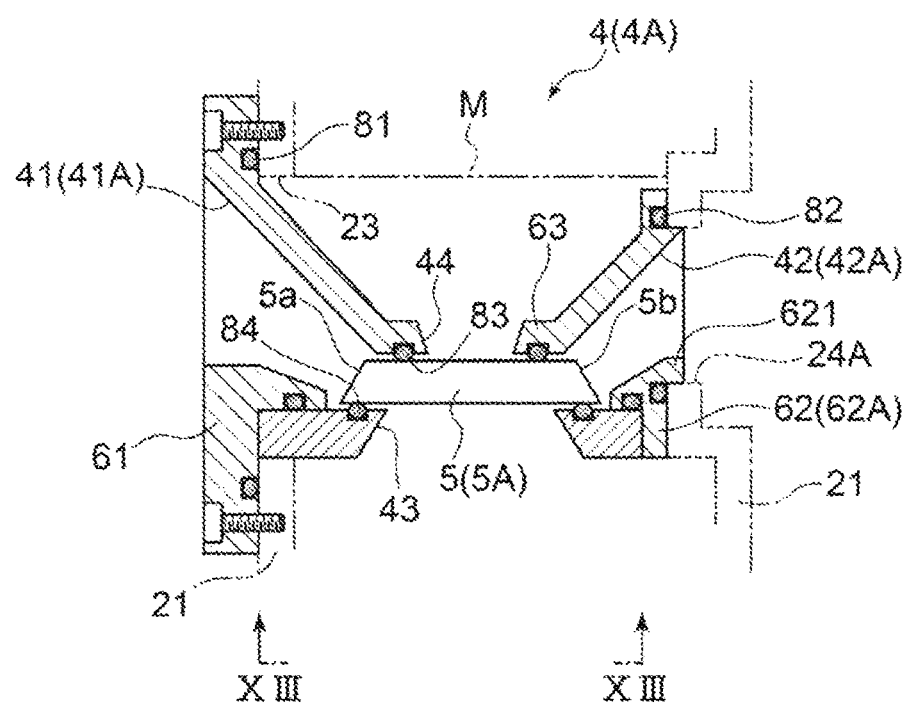
FIG. 11 is a vertical cross-sectional view of a cartridge according to an embodiment.
Figure 12:
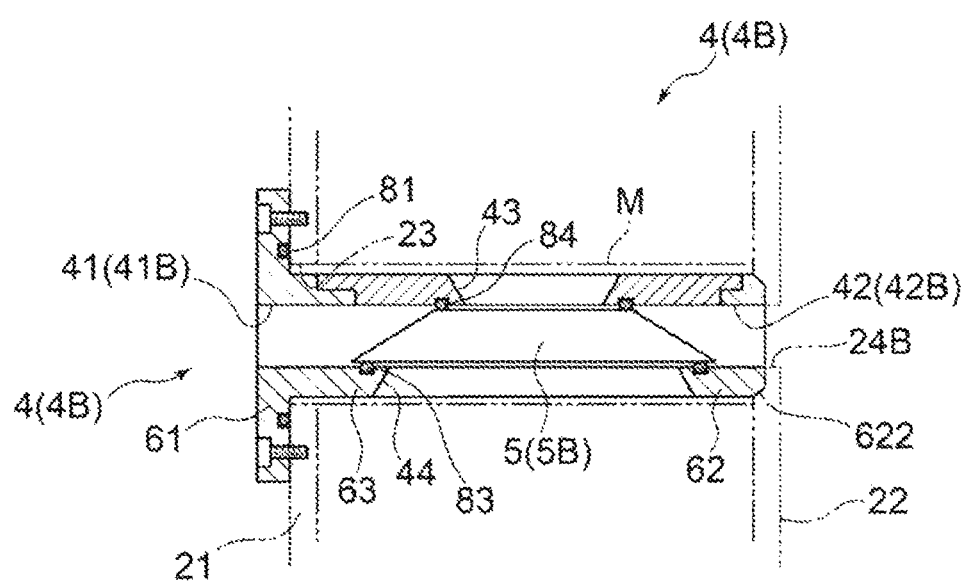
FIG. 12 is a vertical cross-sectional view of a cartridge according to an embodiment.

FIGS. 11 and 12 are each a vertical cross-sectional view of the cartridge 4 according to an embodiment. The cartridge 4 shown in FIG. 11 is attached to the laser oscillation device 1A shown in FIG. 2 so as to be insertable and removable. The cartridge 4 shown in FIG. 12 is attached to the laser oscillation device 1B shown in FIG. 3 so as to be insertable and removable.

Figure 13:
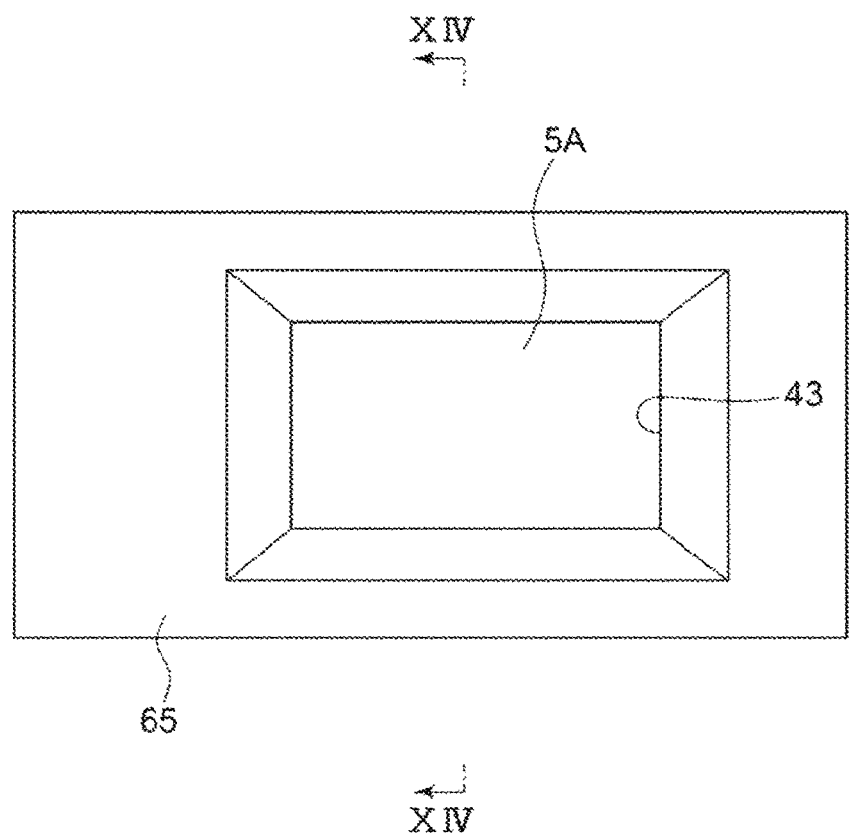
FIG. 13 is a view of the cartridge shown in FIG. 11, as seen in the direction of arrows XIII.
Figure 14:
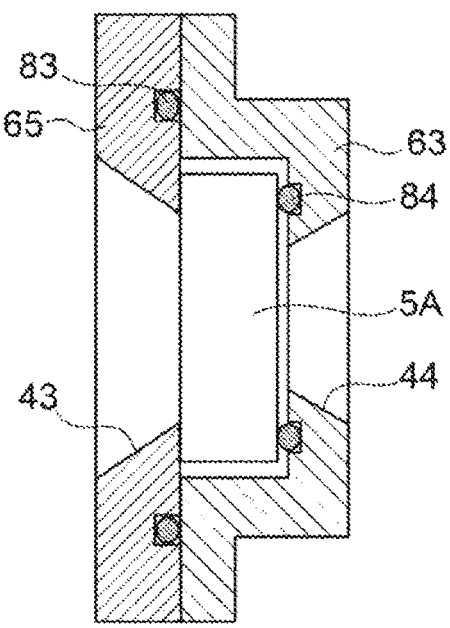
FIG. 14 is a view of the cartridge shown in FIG. 12, as seen in the direction of arrows XIV.

Further, FIG. 13 is a view of the cartridge 4A shown in FIG. 11, as seen in the direction of arrows XIII, and FIG. 14 is a view of the cartridge shown in FIG. 12, as seen in the direction of arrows XIV.

Figure 15:
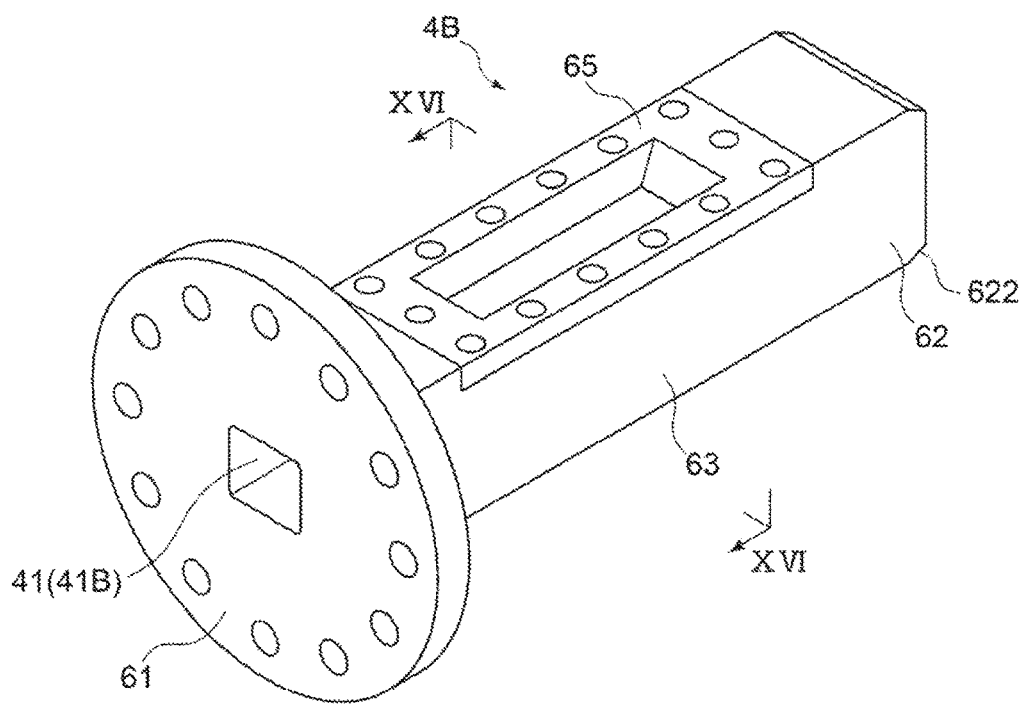
FIG. 15 is a schematic perspective view of an external view of the cartridge shown in FIG. 12.
Figure 16:
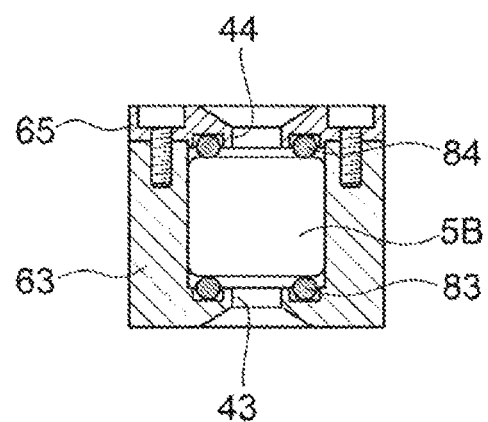
FIG. 16 is a view of the cartridge shown in FIG. 15, as seen in the direction of arrows XVI.
Figure 17:
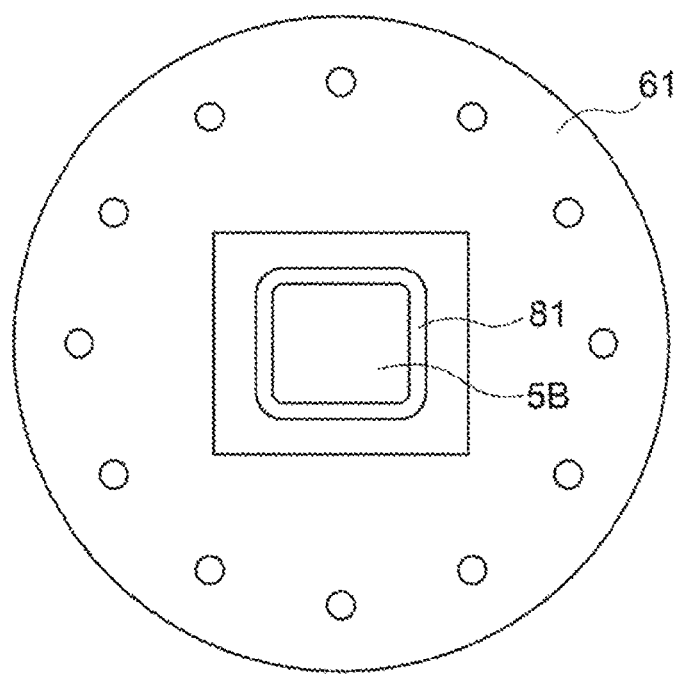
FIG. 17 is a back-side view of the cartridge shown in FIG. 15.

Furthermore, FIG. 15 is a schematic perspective diagram of an external view of the cartridge 4B shown in FIG. 12. FIG. 16 is a cross-sectional view of the cartridge 4B shown in FIG. 15, as seen in the direction of arrows XVI, and FIG. 17 is a back-side view of the cartridge 4B shown in FIG. 15.

As shown in FIGS. 11 and 12, in some embodiments, the cartridge 4 further includes an output path section 42 disposed on an opposite side of the laser gain medium 5 from the incidence path section 41, for guiding the laser light LB outputted from the laser gain medium 5.

In the embodiment shown in FIG. 11, the output path section 42A is configured such that the laser light LB is outputted in a direction perpendicular to the output surface 5b of the laser gain medium 5A (see FIG. 2).

In the embodiment shown in FIG. 12, the output path section 42B is configured such that the laser light LB is outputted along the longitudinal direction of the laser gain medium 5A (see FIG. 3).

With the above configuration, the cartridge 4 further includes the output path section 42 for guiding the laser light LB emitted from the laser gain medium 5, and thereby it is possible to guide the laser light LB emitted from the laser gain medium 5 through the output path section 42.

As shown in FIGS. 11 and 12, in some embodiments, the cartridge 4 has openings 43, 44 in a region facing the nozzle 3, so that a jet stream of the refrigerant R from the nozzle 3 hits the laser gain medium 5.

In the embodiment shown in FIG. 11, as shown in FIGS. 13 and 14, the opening 43 is disposed in a region facing the nozzles 31, 32 (see FIG. 2), so that jet flows of the refrigerant R from the nozzles 31, 32 hit the first surface of the laser gain medium 5A. Similarly, the opening 44 is disposed in a region facing the nozzle 33 (see FIG. 2), so that a jet flow of the refrigerant R from the nozzle 33 hits the second surface of the laser gain medium 5A.

In the embodiment shown in FIG. 12, the opening 43 is disposed in a region facing the nozzles 31, 32 (see FIG. 3), so that jet flows of the refrigerant R from the nozzles 31, 32 hit the first surface of the laser gain medium 5B. Similarly, the opening 44 is disposed in a region facing the nozzle 33 (see FIG. 3), so that a jet flow of the refrigerant R from the nozzle 33 hits the second surface of the laser gain medium 5B.

With the above configuration, the cartridge 4 has the openings 43, 44 in a region facing the nozzle 3, so that a jet flow of the refrigerant R from the nozzle 3 hits the laser gain medium 5, and thereby a jet flow of the refrigerant R from the nozzle 3 passes through the openings 43, 44 in a region facing the nozzle 3 and hits the laser gain medium 5.

As shown in FIGS. 11 and 12, in some embodiments, the cartridge 4 has a flange 61 on the first end side in the longitudinal direction, the flange 61 forming the incidence path section 41. Furthermore, the refrigerant container 2 has a container opening 32 (front opening) which is smaller than the contour of the flange 61 and through which the second end side of the cartridge 4 can pass through. The flange 61 of the cartridge 4 is fixed to the front plate portion 21 forming a wall member of the refrigerant container 2 around the container opening 23.

In the embodiment shown in FIGS. 11 and 12, an O-ring 81 is disposed between the flange 61 of the cartridge 4 and the front plate portion 21 of the refrigerant container 2, thus sealing the gap between the flange 61 of the cartridge 4 and the front plate portion 21 of the refrigerant container 2.

Furthermore, in the embodiment shown in FIGS. 11 and 12, while the flange 61 has a through hole formed thereon, a bottomed threaded hole is disposed on the front plate portion of the refrigerant container 2, in a position corresponding to the through hole. Accordingly, the refrigerant R is prevented from leaking through the threaded hole.

With the above configuration, the second end side of the cartridge 4 is inserted into the container opening 23 of the refrigerant container 2, and the flange 61 of the cartridge 4 is fixed to the front plate portion 21 of the wall member around the container opening 23. Thus, it is possible to replace the laser gain medium 5 in the cartridge 4 easily with respect to the refrigerant container 2.

As shown in FIGS. 11 and 12, in some embodiments, a second end portion 62 of the cartridge 4 is in contact with a rear plate portion 22 forming an inner wall surface of the refrigerant container 2, in a region of the refrigerant container 2 that intersects with a virtual line M extended from the container opening 23 in the longitudinal direction.

In the embodiment shown in FIG. 11, the cartridge 4A has an inlet 621 on the second side in the longitudinal direction, while the refrigerant container 2 has a container opening 24A (rear opening) which is greater than the contour of the inlet 621 and through which the cartridge 4A cannot pass through. Further, the inlet 621 of the cartridge 4A is fitted into the container opening 24A, thus being fixed to the rear plate portion 22 forming a wall member of the refrigerant container 2 around the container opening 24A.

Furthermore, in the embodiment shown in FIG. 11, an O-ring 82 is disposed between the second end portion 62 of the cartridge 4A and the rear plate portion 22 forming the inner wall surface of the refrigerant container 2, thus sealing the gap between the second end portion 62 of the cartridge 4 and the rear plate portion 22 of the refrigerant container 2.

In the embodiment shown in FIG. 12, the cartridge 4B has a position-determining portion 622 on the second side in the longitudinal direction, while the refrigerant container 2 has a container opening 24B (rear opening) in which the position-determining portion 622 fits in, and through which the cartridge 4B cannot pass through. Further, the position-determining portion 622 of the cartridge 4B is fitted into the container opening 24B, thus being fixed to the rear plate portion 22 forming a wall member of the refrigerant container 2 around the container opening 24B.

With the above configuration, the second end portion 62 of the cartridge 4 is in contact with the inner wall surface of the refrigerant container 2 in a region of the refrigerant container 2 that intersects with the virtual line M extended from the container opening 23 in the longitudinal direction, and thereby the second end portion 62 of the cartridge 4 is also supported on the inner wall surface of the refrigerant container 2.

As shown in FIGS. 11 and 12, in some embodiments, the cartridge 4 includes the laser gain medium 5 and a holder portion 63 for holding the laser gain medium 5, the holder portion 63 forming the incidence path section 41. The laser gain medium 5 is disposed so as to be insertable and removable with respect to the holder portion 63 in a direction orthogonal to the longitudinal direction.

In the embodiment shown in FIGS. 11 and 12, an O-ring 83 is disposed between the holder portion 63 and the laser gain medium 5, thus sealing the gap between the holder portion 63 and the laser gain medium 5.

With the above configuration, the laser gain medium 5 is disposed so as to be insertable and removable with respect to the holder portion 63 along a direction orthogonal to the longitudinal direction, and thereby it is possible to replace the laser gain medium 5 easily with respect to the holder portion 63.

As shown in FIGS. 11 and 12, in some embodiments, the holder portion 63 includes a holder body 64 having a holder opening 641 through which the laser gain medium can pass through in a direction orthogonal to the longitudinal direction, and a lid member 65 configured to fix the laser gain medium 5 having passed through the holder opening 641 along with the holder body 64.

In the embodiment shown in FIGS. 11 and 12, an O-ring 84 is disposed between the laser gain medium 5 and the lid member 65, thus sealing the gap between the laser gain medium 5 and the lid member 65.

With the above configuration, the holder portion 63 includes a holder body 64 having a holder opening 641 through which the laser gain medium 5 can pass through in a direction orthogonal to the longitudinal direction, and a lid member 65 configured to fix the laser gain medium 5 having passed through the holder opening 641 with the holder body 64, and thereby the lid member 65 can fix the laser gain medium 5 having passed through the holder opening 641 of the holder body 64 along with the holder body 64.

In some embodiments, the refrigerant R is liquid nitrogen ($LN_2$). Accordingly, the laser gain medium 5 sprayed with the refrigerant R is in an atmosphere of liquid nitrogen ($LN_2$) or nitrogen ($N_2$).

With the above configuration, the refrigerant R is liquid nitrogen, and thus the laser gain medium 5 sprayed with the refrigerant R can be cooled to a temperature not more than 100K.

As shown in FIGS. 5 and 6, in some embodiments, the laser gain medium 5 includes an optical medium 52 transparent to the laser seed light LM and having the first surface 52a and the second surface 52b facing the first surface 52a, and gain medium sheets 53, 54 attached respectively to the first surface 52a and the second surface 52b of the optical medium 52 for amplifying the laser seed light LM. The nozzle 3 is configured to spray the refrigerant R to the gain medium sheets 53, 54.

With the above configuration, the refrigerant R is sprayed to the gain medium sheets 53, 54 to cool the gain medium sheets 53, 54, and thereby it is possible to cool the laser gain medium 5 efficiently.

Figure 18:
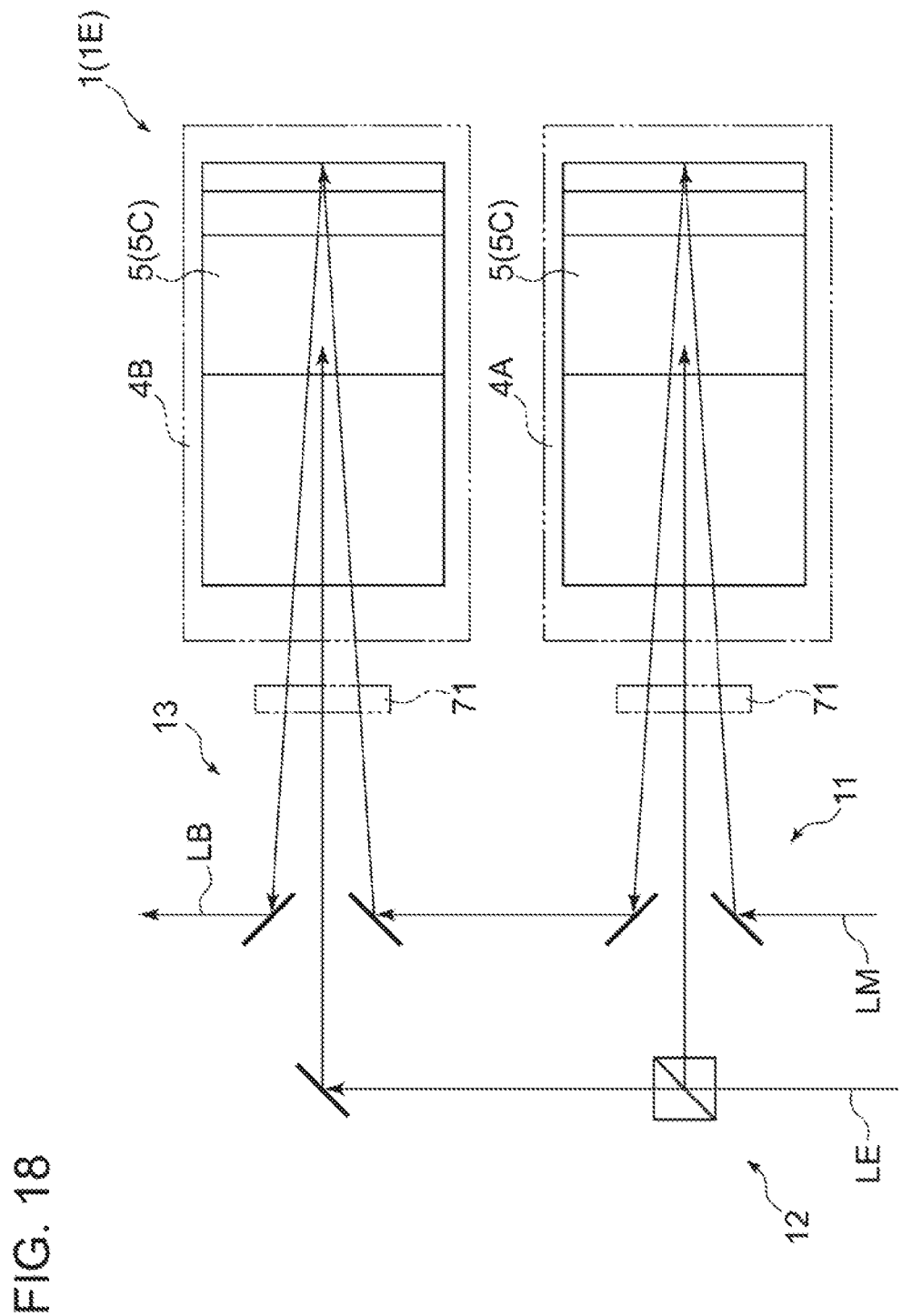
FIG. 18 is a conceptual configuration diagram of a laser oscillation device according to an embodiment of the present invention.

FIG. 18 is a conceptual configuration diagram of a laser oscillation device 1 (1E) according to an embodiment.

As shown in FIG. 18, in some embodiments, a plurality of cartridges 4 including the first cartridge 4C and the second cartridge 4D are disposed so as to be insertable and removable in the longitudinal direction with respect to the refrigerant container 2.

With the above configuration, the plurality of cartridges 4 including the first cartridge 4C and the second cartridge 4D are disposed so as to be insertable and removable in the longitudinal direction with respect to the refrigerant container 2, and thereby it is possible to replace the plurality of cartridges 4 including the first cartridge 4C and the second cartridge 4D easily with respect to the refrigerant container 2.

As shown in FIG. 18, in some embodiments, the laser seed light LM is configured to pass through the laser gain medium 5B of the first cartridge 4C to be amplified, and then pass through the laser gain medium 5B of the second cartridge 4D to be further amplified.

With the above configuration, the laser seed light LM is configured to pass through the laser gain medium 5 of the first cartridge 4C to be amplified, and then pass through the laser gain medium 5 of the second cartridge 4D to be further amplified. Thus, the laser seed light LM passes through the laser gain medium 5 of the first cartridge 4C to be amplified, and then passes through the laser gain medium 5 of the second cartridge 4D to be further amplified FIG. 19 is a conceptual configuration diagram of a laser oscillation device 1 (1F) according to an embodiment.

Figure 19:
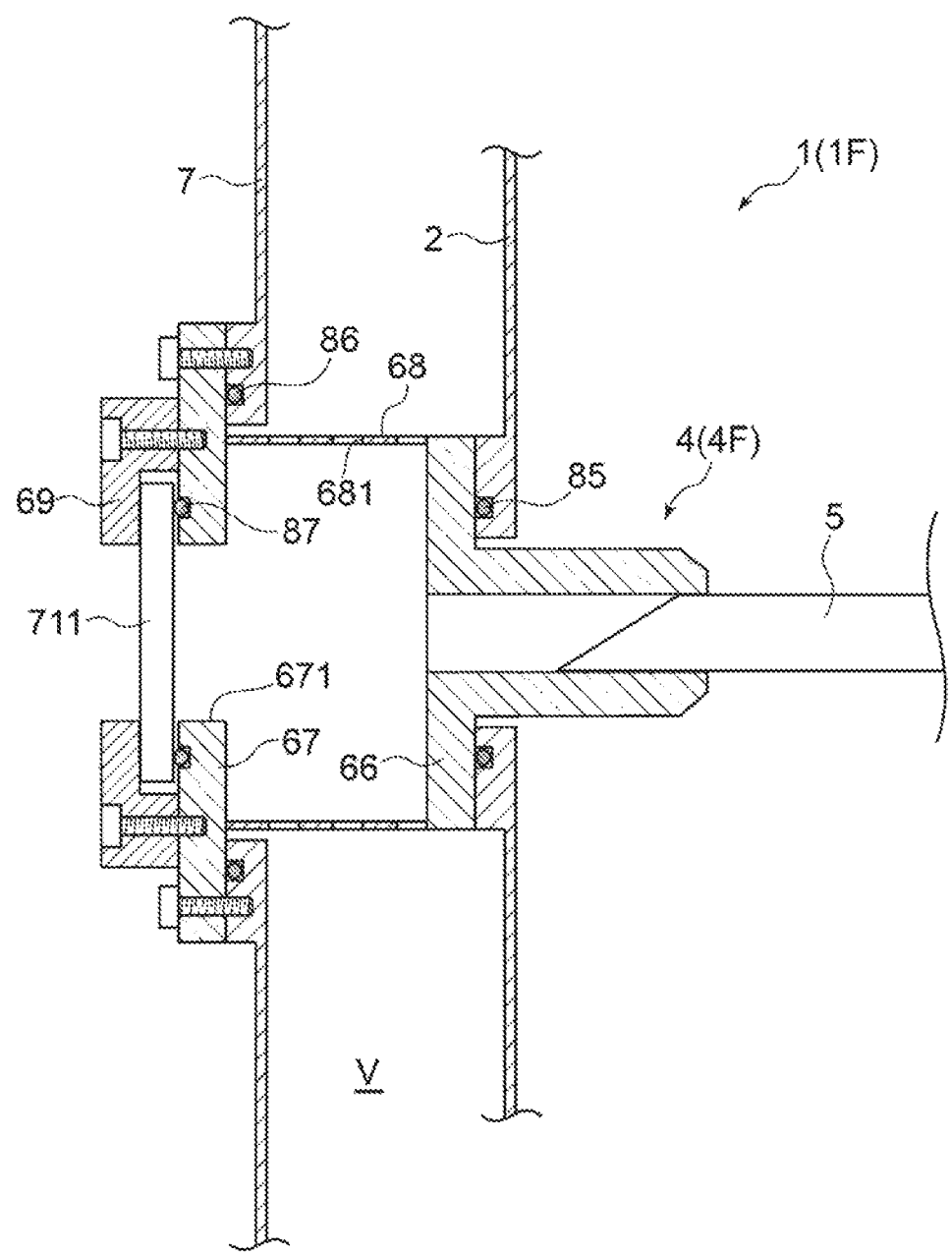
FIG. 19 is a conceptual configuration diagram of a laser oscillation device according to an embodiment of the present invention.

As shown in FIG. 19, in some embodiments, the cartridge 4 is disposed so as to be insertable and removable with respect to the vacuum heat insulating container 7 along the longitudinal direction of the laser gain medium 5.

In the embodiment shown in FIG. 19, the cartridge 4F includes a flange 66, a lid member 67, a coupling member 68, and a frame member 69. The flange 66 is a portion to be in close contact with the refrigerant container 2, and corresponds to the above described flange 61. An O-ring 85 is disposed between the flange 66 and the refrigerant container 2, thus sealing the gap between the refrigerant container 2 and the flange 66 when the cartridge 4F is mounted to the vacuum heat insulating container 7.

The lid member 67 is a portion to be in close contact with the vacuum heat insulating container 7, and corresponds to the above described incidence window 71. An O-ring 86 is disposed between the lid member 67 and the vacuum heat insulating container 7, thus sealing the gap between the vacuum heat insulating container 7 and the lid member 67 when the cartridge 4F is mounted to the vacuum heat insulating container 7.

The coupling member 68 is for coupling the flange 66 and the lid member 67. The coupling member 68 comprises a cylindrically-shaped tube member, and has a hole 681 communicating with the inside of the vacuum heat insulating container disposed on the side surface of the tube member. The frame member 69 is for mounting glass 711 to the incidence window 671 disposed on the lid member 67, and has an annular shape. Furthermore, an O-ring 87 is disposed between the glass 711 and the lid member 67, thus sealing the gap between the glass 711 and the lid member 67.

With the above configuration, the cartridge 4 is disposed so as to be insertable and removable with respect to the vacuum heat insulating container 7 along the longitudinal direction of the laser gain medium 5, and thereby it is possible to replace the laser gain medium 5 merely by removing the cartridge 4 from the vacuum heat insulating container 7.

While the cartridge 4 is disposed so as to be insertable and removable with respect to the vacuum heat insulating container 7 along the longitudinal direction of the laser gain medium 5 in the above configuration, the cartridge 4 is also disposed so as to be insertable and removable with respect to the refrigerant container 2 along the longitudinal direction of the laser gain medium 5, and is attached to the refrigerant container 2.

Embodiments of the present invention were described in detail above, but the present invention is not limited thereto, and various amendments and modifications may be implemented.

DESCRIPTION OF REFERENCE NUMERALS

1, 1A, 1B, 1C, 1D, 1F Laser oscillation device
11 Seed-light incidence system
111 Seed light source
112 Mirror
113 Light polarizer
114 Waveplate
115 Mirror
12 Excitation-light incidence system
121 Excitation light source
122 Focusing lens group
13 Laser-light emission system
131 Mirror
2 Refrigerant container
21 Front plate portion
22 Rear plate portion
23 Container opening (front opening)
24A, 24B Container opening (rear opening)
3, 31, 32, 33 Nozzle
34, 35, 36 Refrigerant pipe
37 Recovery pipe
4, 4A, 4B Cartridge
4C First cartridge
4D Second cartridge
41, 41A, 41B Incidence path section
42, 41A, 42B Output path section
43, 44 Opening
5, 5A, 5B, 5C, 5D Laser gain medium
51, 5C1, 5D1 Corner cube
5a, 5Ca, 5Da Incidence medium surface
5b Output surface
5Cb, 5Db Rear end surface
5Cc Side surface
52 Optical medium
52a First surface
52b Second surface
53, 54 Gain medium sheet
61 Flange
62 Second end portion
621 Inlet
622 Position-determining portion
63 Holder portion
64 Holder body
641 Holder opening
65 Lid member
66 Flange
67 Lid member
671 Incidence window
68 Coupling member
69 Frame member
7 Vacuum heat insulating container
71 Incidence window
711 Glass
81, 82, 83, 84, 85, 86, 87 O-ring
R Refrigerant
V Vacuum heat insulating layer
LE Excitation light
LM Laser seed light

The invention claimed is:
1. A laser oscillation device comprising:
 a refrigerant container;
 at least one cartridge which is attached to the refrigerant container and which includes a laser gain medium and an incidence path section having an incidence path for guiding laser seed light to an incidence medium surface formed on a short width direction of the laser gain medium;
 at least one nozzle for spraying a refrigerant to the laser gain medium, the at least one nozzle being disposed inside the refrigerant container; and
 a vacuum heat insulating container housing the refrigerant container inside and forming a vacuum insulation layer on an outer peripheral side of the refrigerant container,
 wherein the cartridge is disposed so as to be insertable and removable with respect to the refrigerant container along a longitudinal direction of the laser gain medium and an extending direction of the incidence path.

2. The laser oscillation device according to claim 1, wherein the vacuum heat insulating container includes an incidence window for introducing the laser seed light traveling toward the incidence path section into the vacuum heat insulating container.

3. The laser oscillation device according to claim 1, wherein the incidence path section is configured to guide the laser seed light to the laser gain medium along the longitudinal direction of the laser gain medium.

4. The laser oscillation device according to claim 1, wherein the incidence path section is configured to guide the laser seed light to the laser gain medium so that the laser seed light enters in a direction perpendicular to an incidence medium surface of the laser gain medium.

5. The laser oscillation device according to claim 1,
wherein the laser gain medium has a corner cube including at least two faces which form a right angle at an end portion opposite to the incidence path section, and
wherein the incidence path section is configured to guide laser light reflected by the corner cube and outputted from the laser gain medium outside the vacuum heat insulating container.

6. The laser oscillation device according to claim 1, wherein the cartridge further includes an output path section for guiding laser light outputted from the laser gain medium, the output path section being disposed on an opposite side of the laser gain medium from the incidence path section.

7. The laser oscillation device according to claim 1, wherein the cartridge has an opening in a region facing the nozzle so that a jet flow of the refrigerant from the nozzle collides with the laser gain medium.

8. The laser oscillation device according to claim 1,
wherein the cartridge has a flange on a first end side in the longitudinal direction, the flange forming the incidence path section,
wherein the refrigerant container has a container opening which is smaller than a contour of the flange and through which a second end side of the cartridge is passable, and
wherein the flange of the cartridge is fixed to a wall member of the refrigerant container around the container opening.

9. The laser oscillation device according to claim 8, wherein a second end portion of the cartridge is in contact with an inner wall surface of the refrigerant container in a region of the refrigerant container intersecting with a virtual line extended in the longitudinal direction from the container opening.

10. The laser oscillation device according to claim 1, wherein the cartridge includes:
the laser gain medium; and
a holder portion for holding the laser gain medium, the holder portion forming the incidence path section, and
wherein the laser gain medium is disposed so as to be insertable and removable with respect to the holder portion along a direction orthogonal to the longitudinal direction.

11. The laser oscillation device according to claim 10, wherein the holder portion includes:
a holder body having a holder opening through which the laser gain medium is passable in a direction orthogonal to the longitudinal direction; and
a lid member configured to fix the laser gain medium having passed through the holder opening along with the holder body.

12. The laser oscillation device according to claim 1, wherein the refrigerant comprises liquid nitrogen.

13. The laser oscillation device according to claim 1, wherein the laser gain medium includes:
an optical medium which is transparent to the laser seed light and which has a first surface and a second surface facing the first surface; and
a gain medium sheet for amplifying the laser seed light, the gain medium sheet being attached to each of the first surface and the second surface of the optical medium, and
wherein the nozzle is configured to spray the refrigerant onto the gain medium sheet.

14. The laser oscillation device according to claim 1, wherein the cartridge comprises a plurality of cartridges including a first cartridge and a second cartridge which are insertable and removable with respect to the refrigerant container along the longitudinal direction.

15. The laser oscillation device according to claim 14, configured such that the laser seed light passes through the laser gain medium of the first cartridge to be amplified and then pass through the laser gain medium of the second cartridge to be further amplified.

16. A laser oscillation device comprising:
a refrigerant container;
at least one cartridge which is attached to the refrigerant container and which includes a laser gain medium and an incidence path section for guiding laser seed light to the laser gain medium;
at least one nozzle for spraying a refrigerant to the laser gain medium, the at least one nozzle being disposed inside the refrigerant container; and
a vacuum heat insulating container housing the refrigerant container inside and forming a vacuum insulation layer on an outer peripheral side of the refrigerant container,
wherein the cartridge is disposed so as to be insertable and removable with respect to the refrigerant container along a longitudinal direction of the laser gain medium,
wherein the cartridge has a flange on a first end side in the longitudinal direction, the flange forming the incidence path section,
wherein the refrigerant container has a container opening which is smaller than a contour of the flange and
through which a second end side of the cartridge is passable, and
wherein the flange of the cartridge is fixed to a wall member of the refrigerant container around the container opening.

17. The laser oscillation device according to claim 16, wherein a second end portion of the cartridge is in contact with an inner wall surface of the refrigerant container in a region of the refrigerant container intersecting with a virtual line extended in the longitudinal direction from the container opening.

18. A laser oscillation device comprising:
a refrigerant container;
at least one cartridge which is attached to the refrigerant container and which includes a laser gain medium and an incidence path section for guiding laser seed light to the laser gain medium;
at least one nozzle for spraying a refrigerant to the laser gain medium, the at least one nozzle being disposed inside the refrigerant container; and
a vacuum heat insulating container housing the refrigerant container inside and forming a vacuum insulation layer on an outer peripheral side of the refrigerant container,
wherein the cartridge is disposed so as to be insertable and removable with respect to the refrigerant container along a longitudinal direction of the laser gain medium, wherein the cartridge includes:
the laser gain medium; and
a holder portion for holding the laser gain medium, the holder portion forming the incidence path section,
wherein the laser gain medium is disposed so as to be insertable and removable with respect to the holder portion along a direction orthogonal to the longitudinal direction, and
wherein the holder portion includes:
a holder body having a holder opening through which the laser gain medium is passable in a direction orthogonal to the longitudinal direction; and
a lid member configured to fix the laser gain medium having passed through the holder opening along with the holder body.

* * * * *